United States Patent
Saukaitis

(10) Patent No.: US 9,050,562 B2
(45) Date of Patent: Jun. 9, 2015

(54) METHOD OF PREPARING OR RECONDITIONING A LEAK STABLE GAS SEPARATION MEMBRANE SYSTEM

(71) Applicant: SHELL OIL COMPANY, Houston, TX (US)

(72) Inventor: John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 96 days.

(21) Appl. No.: 13/678,328

(22) Filed: Nov. 15, 2012

(65) Prior Publication Data

US 2013/0122187 A1    May 16, 2013

Related U.S. Application Data

(60) Provisional application No. 61/560,522, filed on Nov. 16, 2011.

(51) Int. Cl.
*B01D 65/10* (2006.01)
*B01D 67/00* (2006.01)
*B01D 53/22* (2006.01)
*B01D 71/02* (2006.01)
*C01B 3/50* (2006.01)

(52) U.S. Cl.
CPC .......... *B01D 67/0069* (2013.01); *B01D 53/228* (2013.01); *B01D 65/10* (2013.01); *B01D 71/022* (2013.01); *C01B 3/505* (2013.01); *B01D 2323/42* (2013.01); *B01D 65/108* (2013.01)

(58) Field of Classification Search
CPC .. B01D 67/0069; B01D 65/10; B01D 65/108; C01B 3/505
USPC .......................................... 427/304, 443.1, 8
See application file for complete search history.

(56) References Cited

U.S. PATENT DOCUMENTS

| 5,614,001 | A  | 3/1997 | Kosaka et al. ................ 96/10 |
| 7,390,536 | B2 | 6/2008 | Ma et al. ..................... 427/402 |
| 7,727,596 | B2 | 6/2010 | Ma et al. ..................... 427/419.1 |
| 7,744,675 | B2 | 6/2010 | Saukaitis et al. ............... 95/55 |
| 7,959,711 | B2 | 6/2011 | Saukaitis et al. ............... 95/55 |

(Continued)

FOREIGN PATENT DOCUMENTS

| WO | WO0153005       | 7/2001 | ............... B05D 1/18 |
| WO | WO2008027646    | 3/2008 | ............... B05D 1/36 |
| WO | WO 2008027646 A2 * | 3/2008 | |

OTHER PUBLICATIONS

Ayturk, et al.; "Electroless Pd and Ag Deposition Kinetics of the Coposite Pd and Pd/Ag Membranes Synthesized from Agitated Plating Baths"; Journal of Membrane Science; 330; pp. 233-245; 2009.
Mallory, et al.; Electroless Plating: Fundamentals and Applications; American Electroplaters and Surface Finishers Society; pp. 46-47; 1990.

(Continued)

*Primary Examiner* — Dah-Wei D Yuan
*Assistant Examiner* — Ngaleung V Law
(74) *Attorney, Agent, or Firm* — Charles W. Stewart

(57) ABSTRACT

A method of making a gas separation membrane by providing a plating vessel with a volume of plating solution of gas-selective metal ions into which is placed a porous support. The plating solution is circulated over a surface of the porous support while maintaining conditions within the plating vessel so as to promote the electroless deposition. The circulation rate of the plating solution is such as to enhance the metal deposition onto the surface of the porous support in the formation of the gas separation membrane.

8 Claims, 4 Drawing Sheets

(56) References Cited

U.S. PATENT DOCUMENTS

2006/0016332 A1 1/2006 Ma et al. .......................... 95/55
2009/0120293 A1* 5/2009 Saukaitis .......................... 96/11

OTHER PUBLICATIONS

International Search Report for related PCT/US2012/065051 dated Feb. 11, 2013.

* cited by examiner

METHOD OF PREPARING OR RECONDITIONING A LEAK STABLE GAS SEPARATION MEMBRANE SYSTEM

This application claims the benefit of U.S. Provisional Application No. 61/560,522 filed Nov. 16, 2011, the entire disclosure of which is hereby incorporated by reference.

This invention relates to a method of making leak-stable gas separation membrane systems and a method for reconditioning such systems after a period of use.

For many years there has been an ongoing effort to develop new and improved gas separation membranes and membrane systems useful in selectively separating one gas from a mixture of gases. For instance, hydrogen-permeable composite metal membranes that include a thin noble metal coating over a porous support material are known to be useful in the separation of hydrogen from hydrogen-containing gaseous streams. However, these types of hydrogen separation membranes tend to be unstable in their performance when used in high temperature hydrogen separation applications.

This lack of stability is attributed to leak development in the gas-selective noble metal coating layer and the porous support when it is used in high temperature applications. The development of leaks in the composite gas separation system is in part attributable to the characteristic that makes a porous support suitable for use in gas separation applications: the pores. The pores in the porous support create an uneven surface (e.g., peaks and valleys) upon which the thin noble metal coatings are deposited. During deposition the noble metal tends to deposit on the higher points on the surface first. This can lead to the retention of very tiny pores or defects in the gas-selective noble metal coating layer of the membrane. These tiny pores and defects can be difficult to fill because it is often difficult to attract the noble metal particles, such as palladium, to such small pores and defects selectively.

One approach to avoiding leak formation in noble metal membranes is by the successive plating of a thin layer of noble metal on to a porous support, optionally followed by annealing. For instance, U.S. Pat. No. 7,390,536 discloses a gas separation module for the selective separation of hydrogen gas from a hydrogen gas-containing gaseous stream. The gas separation module of this patent is made by first depositing a gas-selective metal onto a porous substrate followed by abrading the resultant coated substrate and, thereafter, depositing a second layer of a gas-selective metal upon the coated polished porous substrate one or more times. Techniques mentioned for depositing the gas-selective metal include electroless plating. Multiple metal layers are added in an attempt to reduce or eliminate the number of pores through which leaks can occur. However, in practice it has proved difficult to seal the last remaining tiny pores without creating a layer that is too thick to be useful and/or commercially practical due to poor performance (e.g., hydrogen flux is too low) and high manufacturing cost (the amount of nobel metal utilized is too great).

Also, while U.S. Pat. No. 7,390,536 discloses a method of manufacturing a gas separation module that includes a dense gas-selective membrane that is supported on a substrate, it fails to teach a cost effective method for reconditioning or repairing an already manufactured gas separation membrane when the membrane thereof has a defect such that it is no longer, or was never, capable of preventing leaks of undesired gases through the membrane during its use.

Furthermore, and as mentioned above, the known methods for making gas separation membranes require multiple iterations of noble metal deposition, which increases inefficiencies in the manufacturing process. Reducing the number of steps in any manufacturing process typically decreases costs. Thus, there is a need for a more efficient method of making gas-separation membranes and systems. In addition, there remains a need for an economically efficient method to recondition existing gas-separation membranes.

Accordingly, there is provided a method of making a gas separation membrane, wherein said method comprises providing a plating vessel containing a volume of a plating solution having a concentration of a gas-selective metal ion. A porous support is placed within the plating vessel and in contact with the plating solution. The porous support has a first surface and a second surface with each said surface being opposed to the other to thereby define a support thickness.

The porous support is maintained in the plating solution for a time period while maintaining plating conditions within said plating vessel so as to promote the electroless deposition of said gas-selective metal ion from said plating solution onto said first surface of said porous support. During the deposition process the plating solution is circulated through said plating vessel at a desired circulation rate. In this manner a membrane layer of said gas-selective metal is deposited upon said first surface to thereby provide a supported membrane.

Figure 4:
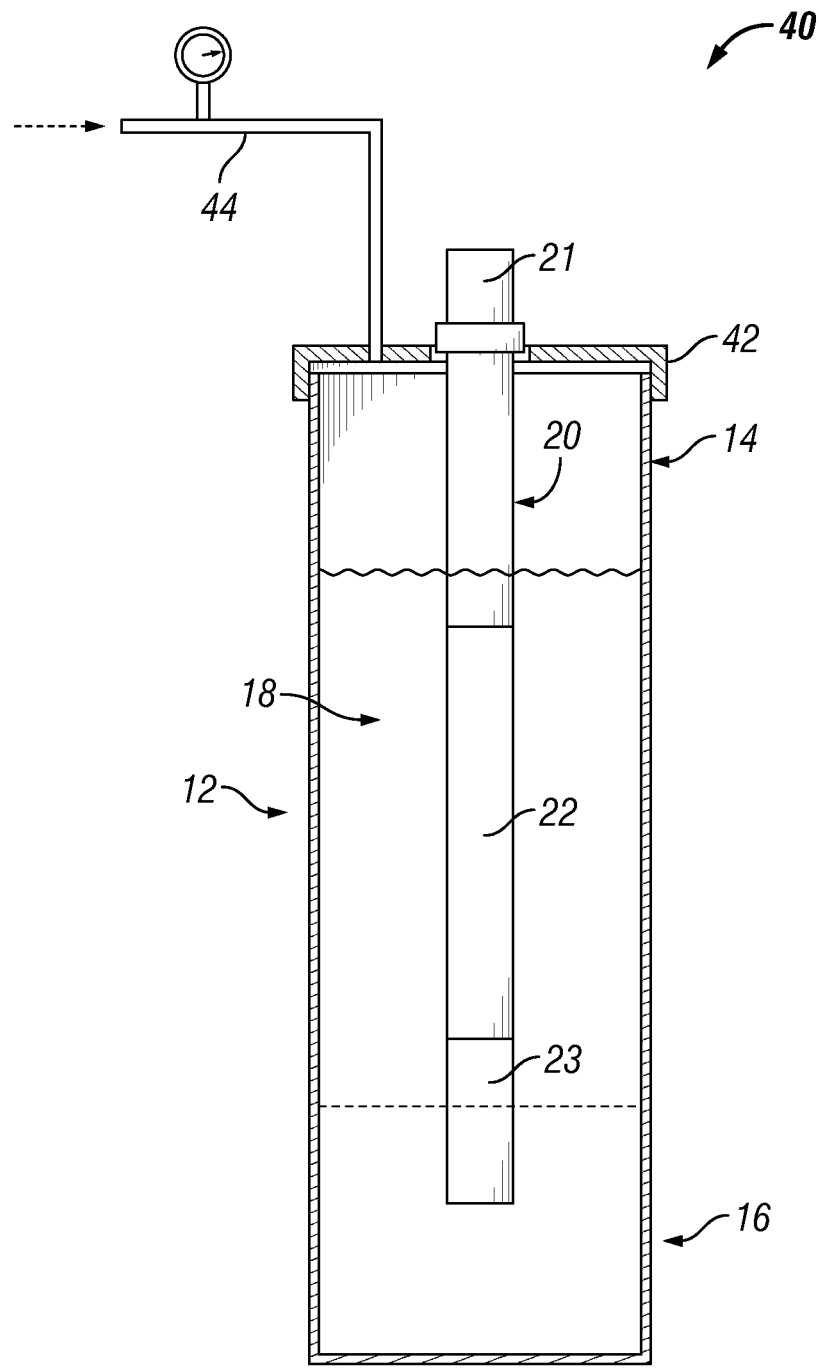

FIG. 4 is a schematic of a plating system illustrating the application of a pressure differential across the thickness of a porous support during an electroless plating process In the following description, for purposes of explanation, numerous details are set forth, such as exemplary concentrations and alternative steps or procedures, to provide an understanding of one or more embodiments of the present invention. However, it is and will be apparent to one skilled in the art that these specific details are not required to practice the present invention.

Furthermore, the following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

As an initial matter, and as an aid to the reader, several terms are defined and a very general description of a gas-separation membrane or system is presented.

Generally speaking, a gas separation membrane as used herein consists of gas permeable porous support upon which successive layers of thin metal films and/or other materials are deposited to form a composite membrane that is impermeable to liquids and specific gases. In this manner the membrane can be used to separate particular gases.

The term "liquid dense" as used herein is a descriptive term applied to a gas-separation membrane system during its manufacture. The term "liquid dense" means that the gas-separation membrane has reached a density such that a liquid (usually water) can no longer travel through its pores upon the application of a pressure differential across the thickness of the membrane and the support upon which it rests. In many instances a membrane is considered "liquid dense" if water is not pulled through the membrane upon the application of a vacuum of a few mmHg.

A gas-selective material, as the term is used herein, is a material that is selectively permeable to a gas when it is in the form of a dense, thin film, and thus, a dense thin layer of such material will function so as to selectively allow the passage of a selected gas while preventing passage of other gases. The term includes gas-selective metals.

The term "gas tight" or "gas dense" as used herein are descriptive terms applied to a gas-separation membrane system during its manufacture. The terms "gas tight" or "gas dense", as used herein mean that the membrane allows for permeation of a specific gas through it but with little, if any, other gas being allowed through it. Thus, the membrane will have high "selectivity" for the specific gas. In many instances the specific gas is hydrogen.

As the term is used herein, "selectivity" is a measured attribute of a membrane or membrane system that is represented by the dimensionless ratio of the flux of a specific gas through the membrane divided by the flux of a leak detecting gas such as nitrogen or helium through the membrane. The term "flux", as used herein, means the rate at which a gas can flow through a membrane at a given pressure. The dimensions used to measure flux can vary depending upon the measurement device used. Typically flux is measured as $m^3/(m^2\ hr\ bar^{1/2})$ which can be converted to ml/min at 1 bar of pressure. The examples discuss membranes that are selective for hydrogen. In the manufacture of high purity hydrogen, an ideal gas selective membrane would have a selectivity that approaches infinity, but, practically, the selectivity relative to nitrogen for a membrane is normally in the range of from 100 to 1,000. The development and formation of leaks in a membrane may result from imperfections in the membrane layer and is an indication that the membrane is not gas tight.

The term "stability" when used in reference to a gas selective membrane means that the membrane may be used in the separation of a specific gas (e.g., hydrogen) from a gas mixture for a lengthy period of time even under reasonably harsh high-temperature and pressure conditions and not develop leaks. Thus, a highly stable membrane has a reasonably low rate of decline in its selectivity during its use.

Turning now to the method according to the invention, the invention relates to a method of preparing or reconditioning a gas separation membrane and its use. More specifically, the invention relates to an economically advantageous method of manufacturing a gas separation membrane system having an exceptionally thin membrane layer of at least one gas-selective material, the resulting gas separation membrane system from such manufacturing method, and the use thereof.

The claimed invention is a method of making a gas separation membrane utilizing an electroless plating technique. In broad terms, an electroless plating process uses a redox reaction to deposit metal on an object without the passage of an electric current.

Generally speaking, in known electroless plating processes, a plating vessel is charged with a known quantity of a plating solution. The plating solution contains a known concentration of a gas-selective metal ion (e.g., palladium or gold) and other components. The article to be plated (e.g., a porous support) is then placed in the plating vessel in contact with the plating solution for a period of time. During this time the redox reaction occurs and a thin layer of the gas-selective metal is deposited on the article. Electroless plating is a preferred method of creating gas separation membranes because the plating solution bathes all parts of the object to be plated and tends to deposit metal evenly along edges, inside holes, and over irregularly shaped objects that are difficult to plate evenly with electroplating.

Electroless technologies involve the reduction of a complexed metal using a mild reducing agent. For example, palladium deposition can occur by the following reaction:

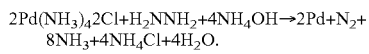

Examples of suitable electroless plating methods for the deposition of gas-selective material are disclosed in U.S. Pat. Nos. 7,390,536 and 7,727,596, both of which are incorporated by reference in their entirety. Additional examples of electroless plating showing the effects of temperature, plating solution component concentrations, and spinning the porous support on the kinetics of Pd and Ag deposition are discussed in Ayturk, et. al., *Electroless Pd and Ag deposition kinetics of the composite Pd and Pd/Ag membranes synthesized from agitated plating baths*, Journal of Membrane Science, 330 (2009) 233-245 ("Ayturk Article"), which is incorporated by reference in its entirety.

However, even though the basic chemistry underlying electroless plating is somewhat understood, several problems continue to plague the commercial manufacture of gas separation membranes. The preparation of noble metal membranes is commonly plagued with the problem of sealing the last pores or defects in the membrane, which impacts the selectivity of the membrane. At this time it is believed that part of the problem is related to the pore distribution of the porous support and mass transfer effects at the interface of the porous support and the plating solution.

In researching methods to improve the sealing of a membrane it was discovered that circulating the plating solution during the electroless plating process facilitates the sealing of the last open pores and defects in the membranes and leads to the manufacture of membranes in a more efficient manner. Other advantages of circulating the plating solution are improvements in the uniformity or evenness of the plating of the membrane layer onto the support and an increase in the plating rate.

It was also discovered that manipulating the pressures surrounding the porous support (and subsequently deposited metal membrane layers) facilitates the sealing of the last open pores and defects in the membranes and leads to the manufacture of membranes in a more efficient manner. Combining the two discoveries improves the efficiencies in the production of gas separation membranes. Furthermore, these discoveries provide the ability to recondition used membranes to a gas tight status and have been used to create gas tight membranes in systems considered incapable of achieving a gas tight condition using prior production methods.

As an aid to the reader the invention will be discussed in the context of the formation of a palladium membrane for separation of hydrogen gas from a mixed gas stream. This contextual aid is not to be interpreted as limiting the scope of the claims.

The method according to the invention begins with the provision of a porous support. The porous support used in the preparation of the gas separation membrane system of the invention or any elements thereof may include any porous material that is gas permeable (e.g., hydrogen permeable) and is suitable for use as a support for the layer(s) of gas-selective material that will be deposited thereon. The porous support may be of any shape or geometry provided it has a surface that permits the application thereto of a layer of intermetallic diffusion barrier particles (discussed below) and/or a layer of gas-selective material. Such shapes may include planar or curvilinear sheets of the porous material. Preferably the porous support has a first surface (e.g., a top surface) and a second surface (e.g., undersurface) opposed to each other to thereby define a support thickness. Alternatively, the shape of the support can be tubular, such as, for example, rectangular, square and circular tubular shapes that have a first surface (e.g., outside surface) and a second surface (e.g., inside surface) that together define a support thickness and with the inside surface of the tubular shape defining a tubular conduit.

The porous support may comprise any suitable porous metal material selected from any of the materials known to those skilled in the art including, but not limited to, the stainless steels, such as, for example, the 301, 304, 305, 316, 317, and 321 series of stainless steels, the twenty or more HASTELLOY® alloys, for example, HASTELLOY® B-2, C-4, C-22, C-276, G-30, X and others, and the INCONEL® alloys, for example, INCONEL® alloy 600, 625, 690, and 718. Thus, the porous support may comprise an alloy that is hydrogen permeable and which comprises chromium, and, preferably, further comprises nickel. The porous metal material may further comprise an additional alloy metal selected from the group consisting of iron, manganese, molybdenum, tungsten, cobalt, copper, titanium, zirconium, aluminum, carbon, and any combination thereof.

One particularly desirable alloy suitable for use as the porous metal material may comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness, as described above), porosity, and pore size distribution of the pores of the porous support are properties of the porous support selected to provide a gas separation membrane system that has the desired performance characteristics and other desired properties. It may be desirable to use a porous support having a reasonably small thickness so as to provide for a high gas flux therethrough.

The thickness of the porous support for the typical application contemplated hereunder may be in the range of from about 0.05 mm to about 25 mm, but, preferably, the thickness is in the range of from 0.1 mm to 12.5 mm, and more preferably, from 0.2 mm to 5 mm.

The term porosity, as used herein, is defined as the proportion of non-solid volume to the total volume (i.e. non-solid and solid) of the porous support material. The porosity of the porous support may be in the range of from 0.01 to 0.5. A more typical porosity is in the range of from 0.05 to 0.3.

The pore size distribution of the pores of the porous support may vary with the median pore diameter typically being in the range of from about 0.1 µm to about 15 µm. More typically, the median pore diameter is in the range of from 0.2 µm to 10 µm, and, most typically, from 0.3 µm to 5 µm.

An optional but recommended step in the practice of the inventive method includes the application of a layer of intermetallic diffusion barrier particles to a surface of a porous support prior to deposition of the gas selective metal ion. The creation of an intermetallic diffusion barrier on a porous support is known in the art and is only generally discussed herein. The purpose of the barrier is to prevent or substantially eliminate diffusion of the metal atoms in the porous support into the thin noble metal membrane deposited on the porous support. Such diffusion can compromise the selectivity of the membrane.

Preferably, the intermetallic diffusion barrier is formed from particles of a material selected from the group consisting of inorganic oxides, refractory metals, noble metal eggshell catalysts and combinations thereof. These particles should be of a size so that they, or at least a portion of the particles, can fit, at least partially, within certain of the pores of the porous support. Thus, the particles generally should have a maximum dimension of less than about 50 µm. Generally, the particle size (i.e., the maximum dimension of the particle) of the diffusion barrier particles depends on the pore size distribution of the pores of the porous support used in the preparation of the gas separation membrane of the invention.

Typically, the median particle size of the particles of inorganic oxides, refractory metals or noble metal eggshell catalyst will be in the range of from 0.1 µm to 50 µm. More specifically, the median particle size can be in the range of from 0.1 µm to 15 µm. It is preferred for the median particle size of the particles to be in the range of from 0.2 µm to 3 µm.

Examples of inorganic oxides that may be used in forming the layer of intermetallic diffusion barrier particles include alumina, silica, zirconia, titania, ceria, silicon, carbide, chromium oxide, ceramic materials, and zeolites, among others. The refractory metals may include tungsten, tantalum, rhenium, osmium, iridium, niobium, ruthenium, hafnium, zirconium, vanadium, chromium and molybdenum, among others. As for the noble metal eggshell catalyst that may be used in forming the layer of intermetallic diffusion barrier particles, such noble metal eggshell catalysts are defined and described in great detail in U.S. Pat. No. 7,744,675, the entire text of which is incorporated herein by reference.

The layer of intermetallic diffusion barrier particles applied to the surface of the porous support to thereby provide a surface treated support should be such as to cover the pores of the porous support and to provide a layer having a layer thickness that is greater than 0.01 µm, and, generally, in the range of from 0.01 µm to 25 µm. It is preferred for the layer thickness to be in the range of from 0.1 µm to 20 µm, and, most preferably, from 2 lam to 3 µm. Preferably, the intermetallic diffusion barrier is applied under a slight vacuum for a short period of time (e.g., or from about 3 minutes to about 10 or 15 minutes at of from 10 mm to 25 mm Hg of vacuum).

Once the desired porous support has been chosen and, if desired, prepared with an intermetallic diffusion layer, the porous support is placed in a plating vessel containing a volume of a plating solution to begin the process of electroless plating. However, before discussing the mechanics of electroless plating according to the invention, it is necessary to discuss an optional step for preparing the porous support that has become standard practice in the art—pretreating or "seeding" of the porous support (also known as "activating" the support).

The "seeding" of the porous support comprises pretreating the porous support with particles of the chosen gas-selective material to provide nucleation sites, which aid in depositing subsequent layers of the gas-selective material. This pretreating can take several forms, some of which may overlap with the process of forming an intermetallic diffusion barrier. For example, in one embodiment of the invention, a porous support is pretreated by coating it with a layer of alumina or a stabilized form of zirconia, such as yttria stabilized zirconia containing palladium or gold.

Alternatively, a porous support can be pretreated by placing a layer of a noble metal eggshell catalyst on the surface of the porous support. A method for applying such a layer of eggshell catalyst to a porous support is taught in U.S. Pat. No. 7,744,675, which is incorporated herein by reference.

Similarly, pretreatment could take the form of applying a nanopowder or nanoparticle of a gas-selective metal or metal alloy to the surface of the porous support as described in U.S. Pat. No. 7,959,711, which is incorporated herein by reference.

A further method of pretreatment is to treat a porous support with a liquid activation composition. For example, a porous support can be immersed in an aqueous acidic solution of stannous chloride then immersed in an aqueous acidic palladium chloride bath to seed the surface with palladium nuclei. Treating a porous support with palladium salt followed by treatment with hydrazine is another method to deposit palladium nuclei on a porous support.

A still further method of pretreatment is to carry out a short plating reaction (discussed below) to "seed" the surface of the porous support with a small amount of the gas-selective material.

Turning now to the electroless plating process, there is provided a plating solution having a concentration of a gas-selective metal ion. The gas-selective metal ion contained in the plating solution used in the practice of the invention may include any metal or metal alloy or mixture of alloyable metals that has the property of being selectively permeable to a gas when placed as a layer upon the surface of a porous support. It is preferred for the gas-selective metal to be hydrogen-selective.

However, there is another characteristic of plating solutions that aids in defining plating solutions that are particularly well suited for use in the practice of the invention. That characteristic is whether or not the particular deposition process is influenced by diffusion and the mass transfer effects associated therewith. At present it is believed that some plating processes are at least partly "diffusion controlled", meaning that agitation appears to improve the rate of metal deposition. Conversely, other references discuss plating solutions in which agitation, either mechanical or with a bubbling gas, appear to hinder the rate of metal deposition up to a point. Mallory, et. al., *Electroless Plating: Fundamentals and Applications*; American Electroplaters and Surface Finishers Society, 1990 (pp. 46-47).

There is disagreement among those in the art regarding whether or not plating solutions containing certain metals (e.g., silver) are diffusion controlled. Variables that come into play in making this determination are varied and include the concentration of the metal ions in solution, other components of the solution (e.g., stabilizers), among other things. However, research to date indicates that the method according to the invention is particularly well suited for use in electroless plating procedures that incorporate plating solutions that are considered (at this time) to be diffusion limited. Such plating solutions include those that contain palladium and gold and alloys thereof.

The methods of forming such solutions are well known to those skilled in the art and need not be discussed in detail herein. Sample plating solutions include those with compositions as described in the Ayturk Article; U.S. Pat. No. 7,727,596; U.S. Pat. No. 7,390,536; U.S. Pat. No. 7,744,675; and US Published Application 2009/0120293. Typical plating solutions comprise a metal ion source (e.g., $PdCl_2$, $Pd(NH_3)_4Cl_2$, $Pd(NH_3)_4Br_2$, $Pd(NH_3)(NO_3)_2$), a complexing agent (e.g., ethylenediaminetetraacetic acid (EDTA), $NH_4OH$, or ethylenediamine (EDA)), a reducing agent ($NH_2NH_2$, $NaH_2PO_2.H_2O$, trimethylamine borane), stablizers and accelerators. Example bath compositions include those shown in Table 1. Certain of the bath component concentrations are shown in Table 1 are taken from the Ayturk Article. Additional sample plating solutions are discussed in the Examples.

TABLE 1

| Chemical | Pd Bath |
| --- | --- |
| $Pd(NH_3)_4Cl_2 \cdot H_2O$ (g/L) | 2.0-4.0 |
| $Na_2EDTA \cdot 2H_2O$ (g/L) | 0-40 |
| $NH_4OH$ (28%) (ml/L) | 190-700 |
| $H_2NNH_2$ (1M) (ml/L) | 2.5-7.5 |
| pH | 10-11 |
| Temp. ° C. | 20-60 |

Preferred ranges for the individual components used to form plating solutions suitable for use in the practice of the invention include those listed in Table 2. More preferred ranges include the following: 3-4 g/L of $Pd(NH_3)_4Cl_2.H_2O$; 20-40 g/L of $Na_2EDTA.2H_2O$; 190-400 ml/L of $NH_4OH$; and temperatures between 35-55° C. Particularly preferred ranges include the following: 3.5-4 g/L of $Pd(NH_3)_4Cl_2.H_2O$; 20-40 g/L of $Na_2EDTA.2H_2O$; 190-250 ml/L of $NH_4OH$; and temperatures of 40-50° C.

TABLE 2

| Chemical | Pd Bath |
| --- | --- |
| $Pd(NH_3)_4Cl_2 \cdot H_2O$ (g/L) | 2.0-4.0 |
| $Na_2EDTA \cdot 2H_2O$ (g/L) | 0-40 |
| $NH_4OH$ (28%) (ml/L) | 190-700 |
| $H_2NNH_2$ (1M) (ml/L) | 7.5-12.5 |
| pH | 10-11 |
| Temp. ° C. | 20-60 |

In simple terms, an electroless plating reaction is a chemical reaction that occurs at the interface of a porous support (or a thin metal layer deposited thereon) and a liquid plating solution. The reactants (e.g., metal ions, reducing agents, etc.) are present in the plating solution in a certain initial concentration. Currently, it is believed that as the reaction at the interface proceeds, the concentration of reactants in the immediate vicinity of the interface becomes depleted. This depletion leads to a concentration gradient extending from the support/liquid interface (i.e., the first surface of the support) to a second point distant from the interface at which the derivative of the concentration profile approaches zero.

In other words, metal ions leave the solution and are deposited on the support at the liquid/support interface, which lowers the concentration of the metal ions in the plating solution in the immediate vicinity of the interface. As one moves away from the interface it is believed that the concentration of the metal ions increases until it reaches a point where the incremental increase between two adjacent points is insignificant and the metal ion concentration is the same as that measured in the bulk plating solution.

In theory, this concentration gradient occurs over a distance of microns and could be considered to create a "depletion blanket" surrounding the porous support. The "blanket" analogy appears to have some validity given research indicating that agitating certain plating solutions can increase plating deposition rates. For example, Ayturk and Ma (the "Ayturk Article") conducted a series of experiments where porous support tubes were spun between 0 and 600 rpm during Pd and Ag plating reactions. Based on the data presented, it appears that the spinning of the support tubes increased the rate of metal deposition.

However, it was observed that if a tube is simply spun in a plating solution it simply rotates within the "depletion blanket" layer and very likely fails to create a full exchange of depleted plating solution for more concentrated plating solution at the support/liquid interface. Similarly, efforts to use bubbles to agitate plating solutions may aid in a more thorough bulk mixing of the plating solution. However, it is believed that any such bubble induced mixing at the support/liquid interface is uneven leading to an increased but inconsistent concentration of reactants at the interface which leads to the less-than-uniform deposition of the gas-separation metal seen in those methods. In addition, excessive mechanical agitation can damage the membranes which are very fragile.

Circulating the plating solution as opposed to spinning the support or bubbling the plating solution is an improved method of providing agitation during electroless plating and leads to improved deposition of gas selective metal. Although research is ongoing and Applicant does not wish to be bound by a particular theory, at this time it is believed that the flow of the circulating plating solution serves to continuously remove or "wipe" the layer of low concentration plating fluid from the support/liquid interface to effectively replenish or increase the concentration of reactants at the point of deposition in a uniform fashion.

Stated alternatively, it is believed that circulating the plating solution through a plating vessel (discussed in more detail below) significantly reduces the distance between the surface of the porous support and the point at which the derivative of the plating solution concentration profile approaches zero as compared to other agitation methods; particularly spinning of the support.

Returning to the exemplary discussion of the method according to the invention, there is provided a plating vessel suitable for use in electroless plating applications. The basic designs of such plating vessels are known to those skilled in the art and need not be discussed here. However, it is necessary to the practice of the invention that the plating vessel be capable of circulating the plating solution during the electroless plating process.

In most instances it is envisioned that the plating vessel will comprise an enclosed space having an inlet and an outlet that are in fluid communication with each other. Preferably, the inlet and outlet are spaced sufficiently apart from one another so as to provide a flow of plating solution across the entire surface of the porous support or supports contained therein. The orientation of the plating vessel is not critical to the practice of the invention thus the vessel can be positioned vertically, horizontally or at an angle.

Similarly, the size of the plating vessel is not thought to be critical to the practice of the invention. In commercial applications it is envisioned that the claimed invention will be suitable for plating vessels having a volume of a few liters to several hundred or thousand liters. The manner of providing circulation of the plating solution can vary in the practice of the invention. In preferred embodiments a pump is situated intermediate the inlet and outlet and circulates the plating solution through the vessel. The pump can be situated inside or outside the plating vessel depending upon the design of the plating vessel. Similarly, the size and type of pump (e.g., centrifugal or peristaltic) utilized depends upon the particular commercial process.

For large scale commercial processes, pumps capable of circulating large quantities of plating fluid per minute (e.g., hundreds or thousands of liters per minute) may be required. For smaller, bench level or highly specialized operations, small peristaltic pumps (such as those used in the examples) set for flow rates in the ml/min or L/min range may be sufficient. As with most industrial processes, the exact process parameters governing implementation of the claimed method will vary somewhat depending upon the equipment available and other production constraints. Exemplary parameters are provided throughout the detailed description as an aid to the reader.

In addition, FIGS. 1-4 are schematic representations of possible plating vessel configurations. FIGS. 1-4 also schematically illustrate the various methods and combinations of negative and positive pressure that can be used to practice the invention. These figures are discussed in more detail in the Example section.

The porous support is placed into the plating vessel and brought into contact with the plating solution. The porous support is maintained in contact with the plating solution for a time period under conditions sufficient to promote the electroless deposition of the gas-selective metal ion from the plating solution onto a first surface (e.g., outer surface) of the porous support to create a concentration profile as discussed above and ultimately create a membrane layer of the gas-selective metal on the first surface of the porous support.

The conditions sufficient to promote the electroless deposition, including temperature ranges, time, plating solution components, etc., are known to those skilled in the art and are discussed in several patents and academic articles, including the aforementioned Ayturk Article. These conditions may vary depending upon the process equipment and the particular goals of the manufacturer, but in many instances it is envisioned that the electroless plating steps will be carried out at temperatures in the range of from 20° C. to 80° C., more preferably in the range of from 30° C. to 70° C., and most preferably in the range of from 40° C. to 60° C.

Similarly, the time for conducting the plating reaction can vary over a wide range depending upon the other plating conditions. In preferred embodiments the plating reactions occur for a time ranging between 10 minutes to 3 or more hours. In preferred embodiments the reactions last between 30 minutes to 120 minutes. Reaction times between 45 minutes and 90 minutes are particularly preferred.

As with other process parameters, the exact circulation rate of the plating solution in the plating vessel can vary depending upon the dimensions of the plating vessel, concentration of the plating solution, temperature of the plating solution, among other factors. In addition, the circulation rate can be defined in different, yet related ways.

For example, one could define a circulation rate in terms of volume per time. Alternatively, one could define a circulation rate as the time taken for one complete pass of the volume of the plating solution through the vessel. In this instance, the circulation rate would be calculated by dividing the volume of the plating vessel by the flow rate of the plating solution (e.g., 1000 volume unit/(250 volume unit/min). For example, one could calculate the circulation rate as the rate that provides for a residence time of the plating solution in the plating vessel (or a transit time through the plating vessel) that is in the range of from 0.1 minutes to an hour or longer. In most commercial applications it is envisioned that the circulation rate will be somewhere between 0.1 minutes and 3 hours, more preferably between 10 minutes and 120 minutes, and most preferably between 20 minutes and 90 minutes.

Another consideration in determining the optimum circulation rate for a particular process is the flow of the plating solution. If the circulation is too slow the benefits of the invention will not be fully utilized. Similarly, if the circulation is too fast the circulation could inhibit the plating process. The quantitative limit on the circulation rate (e.g., number of L/min) for any particular process will likely be an inherent parameter of that process. Qualitatively speaking, the upper limit on the circulation rate is the rate at which it is no longer possible to maintain laminar flow of the plating solution. Stated alternatively, the upper limit for the circulation rate is the rate at which turbulent flow begins.

Turbulent flow defines the upper limit of the circulation rate because the turbulent flow of the plating solution can damage the fragile noble metal layers on the porous substrate. Thus turbulent flow will tend to cause the same problems seen in those processes that utilize agitation methods such as bubbling and should be avoided.

After the plating reaction is conducted for the determined period of time the porous support and the deposited gas selective metal membrane are removed from the plating solution. Thereafter the support and the membrane are washed, dried, and preferably annealed to provide an annealed supported membrane having an annealed membrane layer. The annealing of layers of deposited gas-selective metal is known in the art. Typically the annealing process is conducted under an inert gas atmosphere and at temperatures ranging between 200° C. and 800° C. depending upon the particular gas-selective metal used. An exemplary annealing process is discussed in US Published Patent Application 2009/0120293, which is incorporated by reference.

After annealing, the porous support with its annealed supported membrane layer is polished/abraded to achieve a surface with a Sa value of between about 2.5-0.8 and then placed into contact with a second plating solution within the original plating vessel or a second plating vessel. The polishing/abrading step has been shown to aid in maintaining an even level of plating. Polishing/abrading can also help keep the membrane from becoming too thick.

The second plating solution contains a second gas-selective metal ion concentration. This second gas selective metal ion may be the same as in the first plating solution or different. Similarly, the concentration of the metal ion in the second plating solution (along with the rest of the components of the second plating solution) can be the same as in the first plating solution or different.

The annealed membrane layer is then kept in contact with the second plating solution for a second time period while maintaining plating conditions within the plating vessel (or second plating vessel) and while causing a second concentration profile of the second gas-selective metal ion to form within the second plating solution. As with the first concentration profile, it is believed that the second concentration profile extends from the annealed membrane layer to a second distance point away from the annealed membrane layer at which the derivative of the second concentration profile approaches zero.

The plating solution is then circulated in the same or similar manner as in the first plating step and at a circulation rate sufficient to significantly reduce the distance between the surface of the annealed membrane layer and the second distance point at which the derivative of the second concentration profile approaches zero. The second plating process is continued until a second membrane layer of the second gas-selective material is deposited upon the annealed membrane layer to thereby provide a second supported membrane.

The porous support, now supporting the first annealed membrane layer and a second membrane layer is annealed again to form a porous support, which supports a first and second annealed membrane layer, which together form a second supported annealed membrane. The above steps of plating, washing, annealing and abrading are repeated until there is created a composite gas-selective membrane that is liquid dense, gas tight and gas selective.

Although it is theoretically possible to achieve a gas tight gas-separation membrane by repeating the above plating and annealing steps, there are additional steps that are used in a preferred embodiment of the method according to the invention that have been shown to reduce the number of plating iterations necessary to achieve a gas tight membrane. These optional but preferred steps are discussed below.

The application of a pressure differential across the support thickness during one or more of the plating steps has been shown to reduce the number of plating iterations required to achieve a gas tight membrane. In general terms, the application of a pressure differential consists of creating a higher pressure on one face of the porous support (the face upon which the gas-selective material is deposited) and a lower pressure on opposite face.

One manner of creating such a pressure differential is by the application of a vacuum to the face of the porous support opposite the face upon which the gas-selective metal is deposited. The vacuum draws more of the gas-selective metal into the pores of the porous support, which can aid in creating a gas-tight membrane in fewer steps. However, if too great of a vacuum is applied too early in the process or if a lesser vacuum is applied for too long, excess gas-selective metal can be drawn into the pores, which leads to a heavy and expensive device that may have low permeance. In preferred embodiments, the vacuum is not applied until the annealed membrane layer is liquid dense, which aids in preventing too much gas-selective material being drawn into the porous support.

To determine when the composite gas-selective membrane achieves liquid density, gas tight, and gas selective status, the annealed membrane layer or layers are tested periodically, preferably after each deposition step. In preferred embodiments the annealed membrane layer is tested periodically to determine its density to liquid.

The typical method to test the density of the annealed membrane layer is by applying a defined level of vacuum to one surface of the porous support, typically the surface opposite the annealed membrane layer, while the porous support is exposed to a liquid, usually water. If no water is drawn through the annealed membrane layer the system is considered liquid dense for that particular pressure differential.

In a preferred embodiment of the invention a pressure differential, usually in the form of a vacuum is applied to the porous support once the system is considered liquid dense A weak vacuum can be applied during the first plating reaction if desired and other reaction conditions (e.g., pore size of the porous support) help prevent drawing too much metal into the porous support.

In an alternative embodiment, the application of a pressure differential across the thickness of the support can be accomplished by increasing the pressure applied to the face supporting the annealed membrane layers (i.e., the first face) as compared to the pressure applied to the opposing face (i.e, the second face). A still further alternative is to apply a vacuum and a positive pressure to the support.

After the initiation of plating under a pressure differential, subsequent layers of annealed gas-selective metal are tested at defined intervals to determine if they are approaching the desired permeability and selectivity. Generally speaking, it has been shown that the application of a pressure differential across the thickness of a porous support during the plating process reduces the number of plating steps required to achieve a commercially functional gas separation membrane.

The application of the pressure differential can occur in an increasing, step-wise manner. For example, once the system is considered liquid dense a vacuum of 40 mmHg or less could be applied in the next plating process followed by a 25 mmHg or less vacuum during the next plating process. Alternatively, one could use a standard vacuum, e.g., from 1 mm Hg to 25 mm Hg, during all post-liquid-dense plating processes until the membrane reaches a predetermined level of selectivity. Once the membrane reaches this predetermined level of selectivity a high pressure differential is applied across the substrate and membrane to seal the membrane. This process is discussed in more detail below.

While it is best for the membrane system to have as high a selectivity as possible, typically, an acceptable or desired selectivity for hydrogen, relative to helium, for the membrane system is at least about 100. More typically, the desired selectivity of a membrane system is at least 500, and most typically, the desired selectivity of the membrane system should exceed 1000. The selectivity of the membrane system may even exceed 5,000 or even exceed 10,000 and thus it is desirable for it to have such a selectivity.

As the density of the membrane system increases during layer deposition the leak rate decreases. However, and as noted above, it is often difficult to seal the last few pores in the composite membrane and achieve a gas tight status. Thus, as the composite membrane approaches gas tightness a very high pressure differential is applied across the support thickness to aid in driving gas selective metal into the last remaining pores in the composite membrane. The point in the process at which the high pressure differential is applied can vary somewhat based upon the characteristics of the system and the personal preference of the practitioner. In preferred embodiments of the invention the high pressure differential is applied when the gas leak rate is significantly low enough that the application of the high pressure differential provides for the facilitation of the sealing of the remaining openings in the membrane during the next plating step.

As before, the creation of the high pressure differential can be accomplished using a vacuum applied to the face opposite the membrane layers, a positive pressure applied to the face having the membrane layers, or a combination of a vacuum and positive pressure. In preferred embodiments a vacuum of 20 mmHg or less (or an equivalent pressure differential) is used to seal the final pores in the membrane and achieve the desired levels of permeability and selectivity.

Another alternative but preferred step in the inventive process is the polishing of the surface of one or more layers of gas-selective metal or material that has been coated upon the porous support. If polishing steps are utilized it is preferred that they occur after each annealing step. The polishing improves the surface of the plated layer for further plating by minimizing surface abnormalities and deformities and by filling openings such as cracks, pinholes and other imperfections that may be present in the thin membrane layer. Exemplary abrading and polishing methods are disclosed in US Published Patent Application 2009/0120287.

The plating operation is duplicated as many times as is necessary to achieve the desired thickness of the gas selective metal layer onto the substrate. The typical thickness of the membrane layer supported upon the porous support can be in the range of from 0.001 μm to 50 μm, but for many gas separation applications, a membrane thickness in the upper end of this range may be too thick to provide for a reasonable gas flux that allows for a desired gas separation. Generally, a membrane thickness should be less than 20 μm, and preferably less than 10 μm. As mentioned previously, the claimed invention has shown the ability to achieve commercially acceptable membranes in fewer steps as compared to other known processes.

Another embodiment of the invention relates to a reconditioned gas separation membrane system and a method of making such a reconditioned gas separation membrane system. This reconditioned gas separation membrane system comprises a porous support upon which there is a pre-existing layer of gas selective metal on the first surface of the porous support. The porous support and gas selective metal are the same as those described above.

This reconditioned gas separation membrane system can be manufactured by reconditioning an already manufactured gas separation membrane system that has been in use and which has developed a defect or leak, or one that is freshly manufactured but has an undesirable defect or leak requiring reworking of the gas separation membrane system. For such systems the porous support and the existing membrane layer(s) are placed in a plating solution and proceed through the same steps of deposition and annealing as described above. The steps of applying a pressure differential along with polishing can also be utilized as described above to achieve a reconditioned gas tight and selective membrane system.

The ability to recondition or rebuild an already manufactured gas separation membrane system, as opposed to manufacturing one from scratch, can provide huge cost benefits due to the savings that result from the reuse of the costly porous support and gas-selective materials. For example, recycled membranes typically require only 1-3 plating steps to achieve gas tight status.

Lastly, the gas separation membrane system or elements thereof made by the inventive methods described herein may be used in the selective separation of a select gas from a gas mixture. The gas separation membrane is particularly useful in the separation of hydrogen from a hydrogen-containing gas stream, especially, in high temperature applications.

One example of a high temperature application in which the gas separation membrane system may be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions and the inventive gas separation membrane is useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

The following examples are provided to further illustrate the invention, but they are, however, not to be construed as limiting its scope.

EXAMPLE 1

This example demonstrates the substantial reduction in leak rate that can be achieved using a circulating plating bath.

Two porous supports were utilized in this example. Support A was a 1 inch OD×6 inch length×0.1 inch thick porous Inconel 625 support supplied by Mott Corporation. Support B was a 1 inch OD×6 inch length×0.1 inch thick porous Inconel 625 support supplied by Mott Corporation. The primary difference between Supports A and B were the initial porosities which resulted in Support B having a higher initial leak rate than Support A.

Prior to conducting the plating, each support was provided with an intermetallic diffusion barrier comprising an alumina based eggshell catalyst seeded with palladium such as those described in US 2009/1020293.

The plating solution utilized in this Example comprised 250 grams deionized water, 198 ml of 28-30% ammonium hydroxide solution, 4.0 grams of tetraamminepalladium (II) chloride $(Pd(NH_3)_4Cl_2 \cdot H_2O)$, 40.1 grams ethylenediaminetetraacetic acid disodium salt $(Na_2EDTA_2 \cdot H_2O)$ and sufficient deionized water to make 1 liter total volume to provide a solution with a Pd metal ion concentration of about 4 g/L.

The plating vessel was a glass cylinder lined with polyethylene. The cylinder was approximately 5.7 cm in diameter and 57 cm in length for a total volume of about 1.45 L. A polyethylene tube was connected to the top and bottom of the plating vessel and was in contact with the plating solution contained therein. A peristaltic pump was placed intermediate the ends of the polyethylene tube and was oriented such that the circulation of the plating solution was from the bottom of the plating vessel to the top.

Each support was plated one time at a temperature of 50° C. for 90 minutes. The circulation rate of the plating solution was 1.4 liters per minute. Every 10 minutes the porous support was rotated slightly.

Table 3 shows the mass gain of the support during the plating step and provides the leak rate of the support prior to the plating and the leak rate after the plating. In each case the leak rate is dramatically decreased by the use of the circulating plating bath. Leak rate is based upon the flux of nitrogen through the porous support.

TABLE 3

| Support | Plating temp ° C. | Plating time (min) | Mass Gain (g) | Leak pre-circulating bath plating ($m^3$/(hr $m^2$ $\sqrt{bar}$)) | Leak post-circulating bath plating ($m^3$/(hr $m^2$ $\sqrt{bar}$)) |
|---|---|---|---|---|---|
| A | 50 | 90 | 0.634 | 289.82 | 112.45 |
| B | 50 | 90 | 0.548 | 535.11 | 44.58 |

EXAMPLE 2

This example demonstrates the ability of the claimed process to effectively seal membranes.

In this example, the supports used in Example 1 were used along with two additional supports, Supports C and D. Supports C and D were also Inconel supports supplied by Mott Corporation and differed from supports A and B in their initial porosities and leak rates.

The plating reactions were carried out as described in Example 1. The number of plating steps carried out for each of the supports is shown in Table 8FIG. In each case, the plating temperature was 40° C. and the plating time was 90 minutes. Table 8FIG. also shows the mass gain during the plating reaction and compares the leak rate of the support before plating to the leak rate of the support subsequent to the circulation of the plating material at the end of the final plating step.

The circulation rate in each case was 1.4 liters per minute. In most of the experiments, the final plating step was carried out under a vacuum of less than 1 mm Hg whereas the previous plating step was carried out under a vacuum of 25 mm Hg. For example, looking at Sample No. 2 it is shown that on the $8^{th}$ plating step, which was conducted at 25 mm Hg and without circulation of the plating solution, the resulting membrane still had a leak rate of 60.32 ml/min (at 1 bar). Then on the $9^{th}$ plating step, which was conducted with a circulating plating solution and under high vacuum (i.e., less than 1 mm Hg) the membrane was effectively sealed.

It can be seen that in every case, the leak rate was much lower after the application of a circulating plating solution and high vacuum. Note that the units of the leak rate in Table 4 varies due to the use of different flow meters for different samples.

TABLE 4

| Sample No. | Support Type | Plating # | Plating Temp ° C. | Plating Time (min) | Mass Gain (g) | Leak Pre-circulating Bath & high Vacuum plating | Leak Post-circulating Bath & High Vacuum Plating |
|---|---|---|---|---|---|---|---|
| 1 | C | $12^{th}$ | 40 | 90 | 0.35 | 169.41 ml/min | 1.62 ml/min |
| 1 | C | $13^{th}$ | 40 | 90 | 0.38 | 2.83 ml/min | 0 |
| 2 | C | $8^{th}$ | 40 | 90 | 0.336 | 60.32 ml/min | 0 |
| 2 | C | $9^{th}$ | 40 | 90 | 0.394 | 0^ | 0 |
| 3 | C | $10^{th}$ | 40 | 90 | 0.220 | 7.2 $m^3$/($m^2$ hr $\sqrt{bar}$) | 0.042 $m^3$/($m^2$ hr $\sqrt{bar}$) |
| 3 | C | $11^{th}$ | 40 | 90 | 0.380 | 0.021 $m^3$/($m^2$ hr $\sqrt{bar}$) | 0 |
| 4 | C | $7^{th}$ | 40 | 90 | 0.334 | 0.398 $m^3$/($m^2$ hr $\sqrt{bar}$) | 0.006 $m^3$/($m^2$ hr $\sqrt{bar}$) |
| 4 | C | $8^{th}$ | 40 | 90 | 0.354 | 0.736 $m^3$/($m^2$ hr $\sqrt{bar}$) | 0.003 $m^3$/($m^2$ hr $\sqrt{bar}$) |
| 5 | A | $10^{th}$ | 40 | 90 | 0.402 | 4.15 ml/min | 0^ |
| 5 | A | $12^{th}$ | 40 | 90 | 0.37 | 164.18 ml/min | 0 |
| 6 | A | $4^{th}$ | 40 | 90 | 0.482 | 3.99 ml/min | 0 |
| 6 | A | $5^{th}$ | 40 | 90 | 0.39 | 83.52 ml/min | 0^ |
| 6 | A | $6^{th}$ | 40 | 90 | 0.464 | 2.93 ml/min | 0 |
| 7 | A | $2^{nd}$ | 40 | 90 | 0.432 | 9.27 $m^3$/($m^2$ hr $\sqrt{bar}$) | 18.94 ml/min |
| 7 | A | $5^{th}$ | 40 | 90 | 0.222 | 2.17 $m^3$/($m^2$ hr $\sqrt{bar}$) | 0.015 $m^3$/($m^2$ hr $\sqrt{bar}$) |
| 8 | A | $3^{rd}$ | 40 | 90 | 0.386 | 203.6 ml/min | 4.12 ml/min |
| 9 | B | $5^{th}$ | 40 | 90 | 0.272 | 207 $m^3$/($m^2$ hr $\sqrt{bar}$) | 0.013 $m^3$/($m^2$ hr $\sqrt{bar}$) |
| 9 | B | $6^{th}$ | 40 | 90 | 0.276 | 0.02 $m^3$/($m^2$ hr $\sqrt{bar}$) | 0^ |
| 10 | B | $3^{rd}$ | 40 | 90 | 0.384 | 142.49 ml/min | 0^ |
| 10 | B | $4^{th}$ | 40 | 90 | 0.408 | 13.05 ml/min | 0 |

^ = bubble was present in flowmeter but rate was below 1 ml/min.

EXAMPLE 3

In this Example, the supports used in Example 2 were plated by a conventional non-circulating method.

In the last plating step, a vacuum of <1 mm Hg was imposed on the support. It can be seen in Table 5 that in each case, the leak rate was lower after the application of the vacuum.

TABLE 5

| Sample No. | Support Type | Plating step # | Plating Temp. (° C.) | Plating Time (min) | Mass Gain (g) | Leak Pre-high Vacuum plating | Leak Post-high Vacuum Plating |
|---|---|---|---|---|---|---|---|
| 1  | C | 10 | 40 | 90 | 0.19  | 226.89 ml/min | 5.78 ml/min |
| 2  | D | 5  | 40 | 90 | 0.246 | 46.26 ml/min  | 0^ |
| 6  | A | 7  | 40 | 90 | 0.248 | 230.86 ml/min | 0^ |
| 6  | A | 9  | 40 | 90 | 0.238 | 14.43 ml/min  | 0.63 ml/min |
| 12 | B | 4  | 40 | 90 | 0.256 | 19.1 ml/min   | 1.66 ml/min |
| 13 | B | 5  | 40 | 90 | 0.244 | 16.02 ml/min  | 0.92 ml/min |
| 10 | B | 3  | 40 | 90 | 0.264 | 25.23 ml/mm   | 3.52 ml/min |
| 10 | B | 4  | 40 | 90 | 0.228 | 1.1 ml/min    | 0.07 ml/min |

^ = bubble was present in flowmeter but rate was below 1 cc/min.

EXAMPLE 4

This Example 4 describes the experimental apparatus and several embodiments of the inventive methods and means used in making gas separation membranes.

Figure 1:
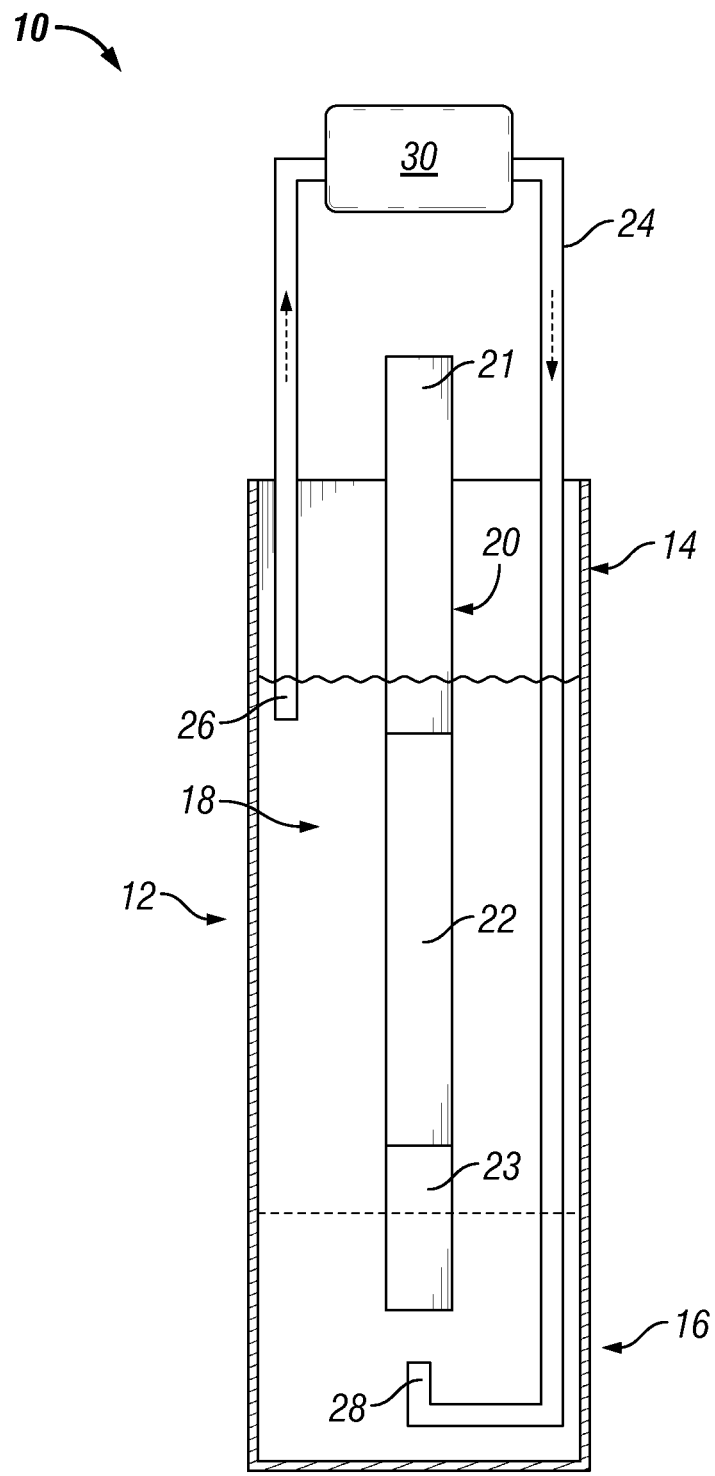
FIG. 1 is a schematic of a plating system that illustrates the circulation of plating solution during an electroless plating process.

As noted previously, FIGS. 1-4 provide schematic representations of plating systems and possible combinations of circulation patterns and pressure differentials that can be used in the practice of the invention. FIG. 1 illustrates one possible configuration of a plating system 10 used in the practice of the invention. The plating system 10 comprises a plating vessel 12 having an open first end 14 and an enclosed second end 16 to form an open cylinder. Plating solution 18 is contained within the plating vessel 12. A cylindrical porous support 20 is submerged in the plating solution 18. The cylindrical porous support 20 is defined by an open first end 21, an enclosed second end 23, and a primary plating section 22 intermediate said first 21 and second 23 ends. The primary plating section 22 forms the primary deposition surface for the noble metal membrane that will be formed.

A tube 24 having a first end 26 and a second end 28 is in fluid communication with the interior of the plating vessel 12 and the plating solution 18 and is positioned such that the first end 26 of the tube is proximate the open first end 14 of the plating vessel 12 and the second end 28 is proximate the enclosed second end 16 of the plating vessel 12. A peristaltic pump 30 is placed intermediate the first end 26 and second end 28 and is oriented so that the flow of plating fluid through the pump 30 is in the direction of the arrows (e.g., a bottom-to-top flow through the plating vessel). Note that the plating system 10 in FIG. 1 is open to the atmosphere and primarily demonstrates the circulation aspects of the invention.

Figure 2:
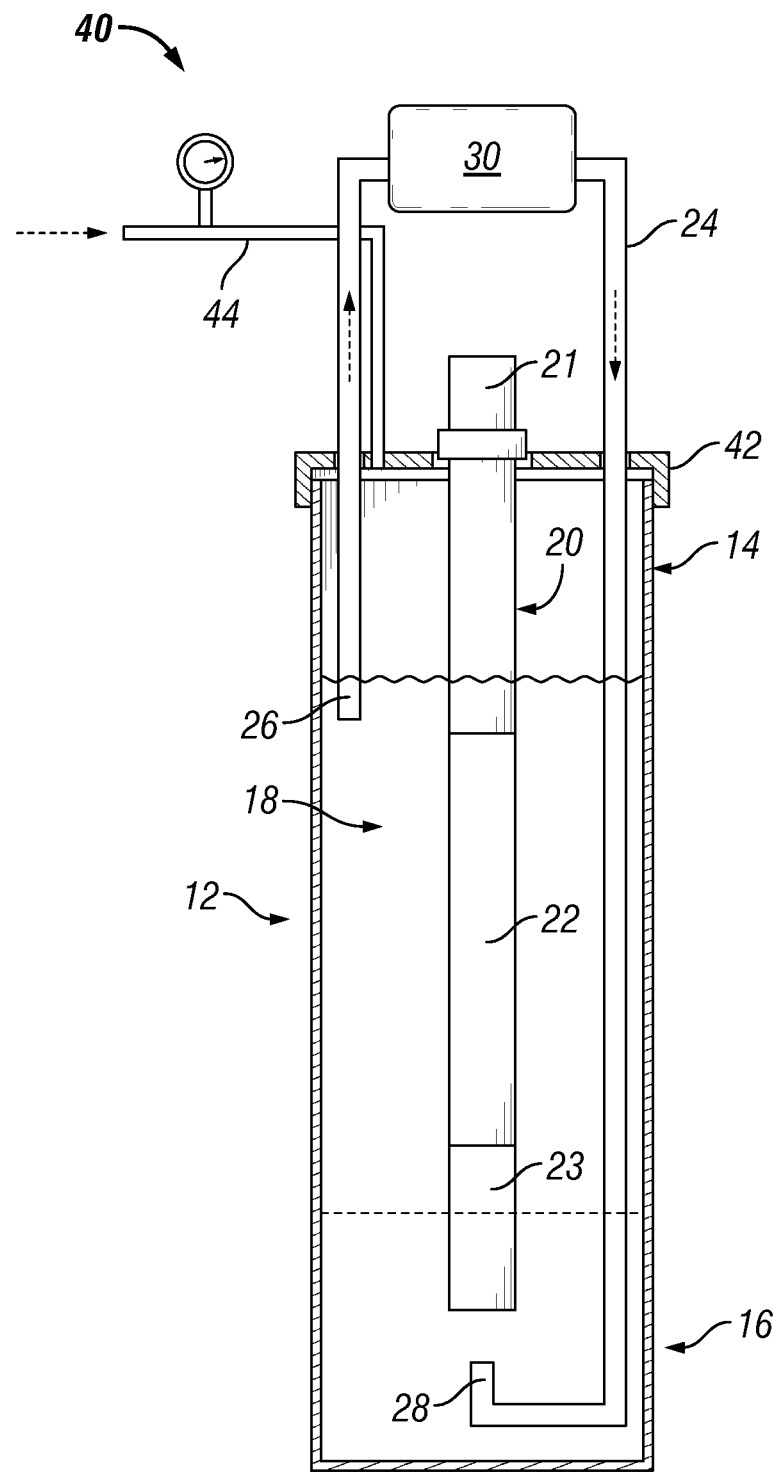
FIG. 2 is a schematic of a plating system illustrating circulation of plating solution and the application of a pressure differential across the thickness of a porous support during an electroless plating process.

FIG. 2 illustrates a plating system 40 that is similar to the plating system 10 of FIG. 1. Unlike the system shown in FIG. 1, the plating vessel 12 of FIG. 2 is enclosed by an annular seal or top 42 through which extends the first end 21 of the cylindrical porous support 20. The open first end 21 of the cylindrical porous support 20 engages with the annular seal 42 to form an air tight barrier. A source of pressurized gas is provided to the interior of the plating vessel 12 via a pressurized gas line 44. Thus, the only form of fluid communication between the interior of the plating vessel 12 containing the plating solution 18 and the exterior of the plating vessel 12 is whatever fluid communication is provided by the pores in the cylindrical porous support 20 and any thin noble metal layers deposited thereon.

Note that the flow of the plating solution 18 in FIG. 2 is the same as in FIG. 1.

FIG. 2 illustrates an embodiment of the invention in which a positive pressure applied to the outer surface of the cylindrical porous support 20 can create a pressure differential that aids in the formation of a gas tight and gas selective membrane.

Figure 3:
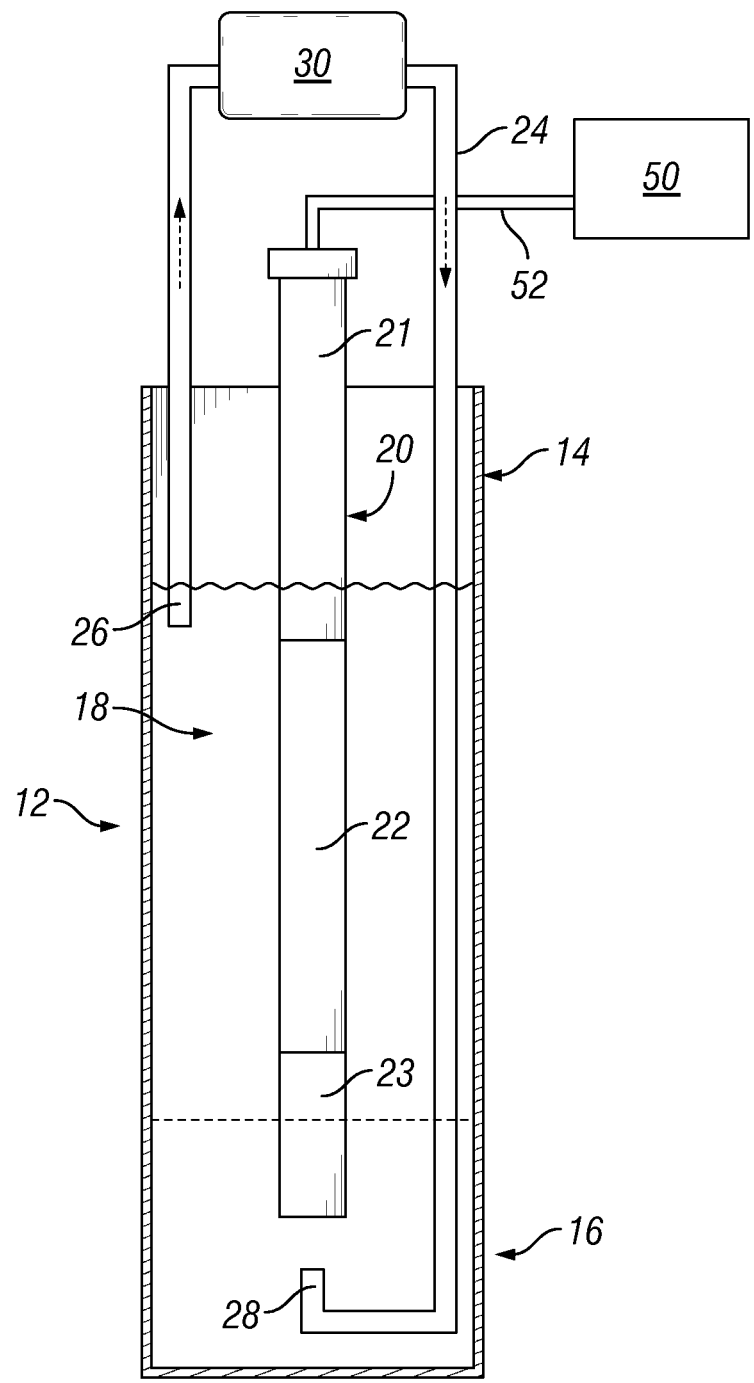
FIG. 3 is a schematic of a plating system illustrating circulation of plating solution and the application of a pressure differential across the thickness of a porous support during an electroless plating process.

FIG. 3 is similar to FIG. 1 in that it illustrates an open plating vessel 12 with a similar flow of plating solution. FIG. 3 also illustrates the attachment of a vacuum pump 50 to the cylindrical porous support 20 via vacuum line 52 as a means of creating a pressure differential to aid in the formation of a gas tight and gas selective membrane. In this example a vacuum is drawn on the interior of the porous cylindrical tube 20 to create a pressure differential across its thickness.

FIG. 4 is similar to FIG. 2 except that the embodiment shown in FIG. 4 does not utilize circulation of the plating solution 18.

As many possible embodiments may be made of the invention without departing from the scope thereof, it is to be understood that all matter herein set forth is to be interpreted as illustrative and not in a limiting sense.

While the invention has been described with respect to a various embodiments thereof, it will be understood by those skilled in the art that various changes in detail may be made therein without departing from the spirit, scope, and teaching of the invention. Accordingly, the invention herein disclosed is to be limited only as specified in the following claims.

What is claimed is:

1. A method of making a gas separation membrane, wherein said method comprises:
   (a) providing a plating vessel containing a volume of a plating solution having a concentration of a gas-selective metal ion, said plating vessel having an inlet and an outlet that are in fluid communication with each other;
   (b) placing a porous support, having a first surface and a second surface with each said surface being opposed to the other to thereby define a support thickness, into said plating solution and thereby contacting said first surface with said plating solution;
   (c) circulating said plating solution through said plating vessel employing a pump situated intermediate the inlet and outlet at a circulation rate such as to provide for a residence time of said plating solution through said plating vessel that is in the range of from 0.1 minutes to 30 minutes;

(d) maintaining said porous support in said circulating plating solution for a time period while maintaining plating conditions within said plating vessel so as to promote the electroless deposition of said gas-selective metal ion from said plating solution onto said first surface of said porous support to form a membrane layer of said gas-selective metal upon said first surface to thereby provide a supported membrane;

(e) after said time period, removing said supported membrane from said plating solution and annealing said supported membrane to provide an annealed supported membrane having an annealed membrane layer;

(f) placing said annealed supported membrane into a second plating solution, having a second gas-selective metal ion concentration, contained within said plating vessel or a second plating vessel having an inlet and an outlet that are in fluid communication with each other, and thereby contacting said annealed membrane layer with said second plating solution for a second time period while maintaining plating conditions within said plating vessel or said second plating vessel;

(g) measuring the density of said annealed membrane layer to determine its density to liquid, and if said annealed membrane layer is determined to be liquid dense, then applying during the contacting of said annealed membrane layer with said second plating solution a pressure differential of a higher pressure and a lower pressure across said support thickness with said higher pressure being applied to the side of said first surface; and (h) circulating said second plating solution through said plating vessel or second plating vessel employing a pump situated intermediate the inlet and outlet at a second circulation rate such as to provide for a residence time of said second plating solution through said plating vessel or second plating vessel that is in the range of from 0.1 minutes to 30 minutes;

whereby a second membrane layer of said second gas-selective metal is deposited upon said annealed membrane layer to thereby provide a second supported membrane.

2. A method as recited in claim 1 further comprising:
repeating steps (e), (f), (g) and (h) with each resulting supported membrane and each resulting annealed membrane layer until the resulting annealed membrane layer is gas dense.

3. A method as recited in claim 1 wherein said step of applying a pressure differential comprises one of the following steps: (a) applying a vacuum to said second surface of said porous support, (b) increasing the pressure applied to said first surface of said porous support as compared to the pressure applied to said second surface of said porous support, or (c) combinations of (a) and (b).

4. A method as recited in claim 1 wherein there is a pre-existing layer of gas-selective metal on said first surface of said porous support.

5. A method as recited in claim 1 wherein the gas-selective metal in the plating solution in step (a) and the second plating solution in step (f) is selected from the group consisting of palladium, gold and alloys thereof.

6. A method as recited in claim 1 wherein the circulation of said plating solution through said plating vessel and said second plating solution through said second plating vessel is a bottom-to-top flow.

7. A method as recited in claim 3 wherein the pressure differential in step (g) is accomplished by using a vacuum of 25 mmHg or less applied to said second surface of said porous support.

8. A method as recited in claim 2 wherein the pressure differential in the final repetition of step (g) is accomplished using a high vacuum of less than 1 mmHg applied to said second surface of said porous support.

* * * * *